United States Patent [19]

Margolis

[11] Patent Number: 5,452,133
[45] Date of Patent: Sep. 19, 1995

[54] VARIATOR OPTICAL SYSTEM

[76] Inventor: H. Jay Margolis, 704 Mohawk Dr., #15, Boulder, Colo. 80303

[21] Appl. No.: 101,544

[22] Filed: Aug. 2, 1993

[51] Int. Cl.[6] ................................................ G02B 15/02
[52] U.S. Cl. .................................... 359/672; 359/673; 359/674; 359/675
[58] Field of Search ................................. 359/672–675

[56] References Cited

U.S. PATENT DOCUMENTS 3,853,387  12/1974  Demaine et al. ................. 359/672
4,427,268  1/1984  Ikemori ............................ 359/673

*Primary Examiner*—Scott J. Sugarman
*Attorney, Agent, or Firm*—Donald W. Margolis

[57] ABSTRACT

An afocal optical module simulator (aoms) for use in conjunction with one or two other optical modules to simulate an afocal variator optical system. The aoms is comprised of an optical module having a front and a rear end, and includes a movable negative lens. The front end of the aoms includes a mechanism for securing a front optical module which may include as its rear most element a positive lens system which will be located juxtaposed to, but spaced from, the movable negative lens within the aoms. Similarly, the rear end of the aoms includes a mechanism for securing a rear optical module, which includes as its front most element a positive lens system which will be located juxtaposed to, but spaced from, the movable negative lens within the aoms. The front optical system provides an optical element adjacent to the front of the movable negative central optical element, and/or a rear optical system provides an optical element adjacent to the rear of the movable negative central optical element, which front and/or a rear optical system can be connected in combination to vary the actual focal length of the front optical system in conjunction with the rear optical system without the need to physically change the length dimension of any system, and without the need to change the position of any lens other than the central movable negative optical element, and without the need to change the lenses of the front or rear optical systems.

11 Claims, 1 Drawing Sheet

VARIATOR OPTICAL SYSTEM

BACKGROUND OF THE INVENTION a) Field of the Invention

This invention relates to an optical imaging system. More specifically it relates to such a system in which a partial variator system is used in conjunction with either or both a front optical systems and a rear optical system, in which either the front optical system, the rear optical system, or both the front and rear optical systems provide one or more optical element in conjunction with the partial variator system to form an afocal variator.

b) Discussion of the Prior Art

"Varios" and "variators" are well known and useful optical systems. Such systems have found use primarily in zoom lens systems and in projectors, for example, to change the size of a projected image on a screen. Afocal variators of the specific type described in the present application have been known and in commercial use and on sale, by themselves, for at least twenty years, for example for use in projector lenses to alter the size of a projected image on a screen. The applicant of the present invention has taught the use of variators as focusing devices in the following listed related applications in conjunction with both refractive and partially obscured reflective optical systems. However, in all such instances, such variator optical systems have been used as complete and separate subsystems, independent of the front and of the rear imaging optical systems with which they are interfaced. That is, that while the front and the rear imaging optical systems are taught to be connected to and integrated with the variator, as modules, neither the front optical system, nor the rear optical system, nor the combined front and rear optical systems, as previously taught by applicant, does any portion of those optical systems provide an element of the afocal variator. That is, in the prior art, no portion of the front optical system, nor of the rear optical system, nor of the combined front and rear optical systems are taught or suggested to be subsumed into nor form a working portion of the afocal variator.

Applicant's related applications include U.S. Pat. No. 5,191,469 entitled AFOCAL VARIATION FOCUSING SYSTEM FOR MIRRORED OPTICAL SYSTEMS, U.S. Pat. No. 5,054,896 entitled CONTINUOUSLY FOCUSABLE MICROSCOPE INCORPORATING AN AFOCAL VARIATOR OPTICAL SYSTEM, and U.S. Pat. No. 4,988,173 entitled MODULAR AFOCAL VARIATOR OPTICAL FOCUSING SYSTEM.

In other known prior art, Hillman U.S. Pat. No. 2,937,570 discloses a telescope system in which the image forming lenses are moved in order to focus the system. That is, focusing is accomplished by moving the objective lens relative to the focusing lens, both of which are part of the telescope's "formula-specific" objective imaging system. Focusing is not accomplished or taught to be feasible by moving a central, modular position of an afocal variator, nor by determining the optical effect of an afocal variator and incorporating its front and rear elements into the image-forming optics, but still retaining a central modular element which is non-image-forming and essentially non-formula-specific.

Matsumura U.S. Pat. No. 4,318,585 discloses an optical system with an afocal focusing group, but in which the afocal focusing group is a Galilean telescope rather than an afocal variator. Furthermore, the system as taught by Matsumura does not incorporate the front, rear or front and rear elements of an afocal variator into the calculation and formulation of the image forming optics.

Quendreff French Patent 2,572,545 teaches the use of a zoom lens to make enlarged pictures, and also teaches the use of various art known mechanical devices for connecting together optical modules. However, it neither teaches nor suggests the use of an afocal variator, nor of a system in which one or more of the outer optical elements of an afocal variator are subsumed into the formula-specific, image-forming optics.

It is thus seen that, while the use of varios and variators have been taught by the applicant in conjunction with front and rear refractive optical systems, and front and rear partially-obscured reflective optical systems, the use of a partial variator system in conjunction with both a front optical system and with a rear optical system, in which either the front optical system, the rear optical system, or the front and rear optical systems provide one or more optical element in conjunction with a partial variator system in order to complete and to form an afocal variator system, has not been previously taught or suggested by the known prior art.

SUMMARY OF THE INVENTION

In view of the foregoing, it is an object of the present invention to provide a modular optical system in which a centrally located partial afocal variator optical system module which lacks either a front optical element, or a rear optical element, or both a front and a rear optical element, is combined with a front and a rear optical system module; whereby, by dint of either the front optical system module, or the rear optical system module, respectively, or both the front and the rear optical system modules, either a subsumed front optical element or a subsumed rear optical element or both a subsumed front and subsumed rear optical element are provided to complete the partial afocal variator optical system module which is then, by movement of the negative optical element in the partial afocal variator optical system module, is now capable of functioning to alter the active focal length of the combined system.

It is another object of the present invention to provide at least the central negative element of an afocal variator system within a modular optical system in which the front optical element, or the rear optical element, or both the front and rear optical elements of the afocal variator optical system are provided by the front optical system module, or the rear optical system module, or the combination of the front optical system module and the rear optical system module, whereby the central negative element of the afocal variator system becomes subsumed and incorporated into an image-forming, formula-specific optical system.

It is another object of the present invention to reduce the number of optical elements in a modular afocal variator optical system in which a centrally located afocal variator optical system is combined with a front optical system module in combination with a rear optical system module, thereby reducing the cost of such a modular system.

Another object of the present invention is to produce optical systems with the essential characteristics of an optical system containing a separate, individual afocal variator, thereby reducing the total number of transmissive optics and as a result, reducing the semi-opaque losses caused by additional lens elements the optical device is used at specific light wavelengths, for example, when used with ultraviolet light wavelengths.

Another object of the present invention is to derive optical systems essentially equal to those incorporating a separate afocal variator module, combined with a front optical system module and a rear optical system module, thereby permitting the custom design of the front and rear afocal variator lens elements by including them into the image-forming, formula-specific optics surrounding a central modular, non-formula-specific, negative lens system.

Another object of the present invention is to provide a negative lens system which is suitable for use in an afocal variator, and which is capable of being moved toward or away from an associated front optical module, rear optical module, or both a front and rear optical module image-forming, formula-specific optical system, which the associated front optical module, rear optical module, or front and rear optical modules providing the optical elements which are required, along with the movable negative lens system to form an afocal variator.

Another object of the present invention is to provide such a partial afocal variator module which is simple in construction and design.

Another object of the present invention is to provide a partial afocal variator module focusing means for use with refractive, partially-obscured reflective and combined refractive/partially obscured reflective optical devices.

The foregoing objects of the present invention are obtained by providing an afocal optical module simulator which can be used in conjunction with at least two other optical modules to simulate an afocal variator optical system. Such an afocal optical module simulator is comprised of an optical module having a front end and a rear end, such as a fixed length tube, and which includes within that optical module simulator a movable negative lens. The front end of the afocal optical module simulator includes a mechanism for receiving and securing a front optical module, which front optical module includes as its rear most element a positive lens system which will be located juxtaposed to, but spaced from, the movable negative lens within the optical module simulator. In a similar manner, the rear end of the afocal optical module simulator includes a mechanism for receiving and securing a rear optical module, which rear optical module includes as its front most element a positive lens system which will be located juxtaposed to, but spaced from, the movable negative lens within the optical module simulator.

In such a system, a front optical system provides an optical element adjacent to the front of the movable negative central optical element, and/or a rear optical system provides an optical element adjacent to the rear of the movable negative central optical element, which front and/or a rear optical system can be connected in combination to vary the actual focal length of the front optical system in conjunction with the rear optical system without the need to physically change the length dimension of any system, and without the need to change the position of any lens other than the central movable negative optical element, and without the need to change the lenses of the front or rear optical systems. Such an optical system or optical instrument essentially has the focusing characteristics of a modular afocal variator focusing system as taught by applicant's the above identified patents.

In preferred embodiments this is accomplished by first calculating and formulating a modular optical system or optical instrument which includes an afocal variator as the focusing means between a front optical system and a rear optical system; and then, by a process of subsumation, which includes the incorporation of the rear, the front, or the rear and the front optical elements, respectively, of the associated front, or rear, or front and rear optical system, to thereby effectively design and complete the afocal variator optical system. Stated another way, the front and rear image-forming, formula-specific optics of the front, the rear, or the front and the rear optical elements of the afocal variator system may be provided by the front optical system, the rear optical system, or the front optical system and the rear optical system. By providing one or two of the afocal variator elements from the associated front and/or from the associated rear optical systems, the central negative lens system of the original afocal variator may remain essentially unchanged in the system, with virtual disregard to formula-specificity. The movable central negative lens of the original afocal variator thereby becomes an independent modular component.

Within the total optical device, the negative modular component of the present invention can be so positioned and controlled that it is capable of operating like an afocal variator optical module by being moved continuously towards and away from the front optical system module, and towards and away from the rear optical system module of a total optical system device or instrument. This is due to the fact that the front and/or rear optical system modules, having been subsumed into and incorporated with the movable central negative modular component of the present invention, so that such front and/or rear optical system modules provide optical powers and characteristics of either the front optical system module, or the rear optical system module, or both the front optical system module, and rear optical system module of the theoretical afocal variator system upon which the total optical system device or instrument is predicated, all while the length of the total optical system device remains substantially constant.

It is thus seen that the system of the present invention uses an independent non-image forming movable negative central lens system module, which together with the front and/or rear modular imaging systems, provides essentially the same system function as such a modular system in which a complete, independent afocal variator modular optical system is present. Since the front and rear image-forming optical system modules surrounding the afocal variator movable negative lens module incorporate and subsume the characteristics of a complete afocal front and/or rear lens systems of the afocal variator, the central movable negative modular system is virtually the same as an afocal variator in which the front and/or rear lenses were not subsumed and incorporated from a front and/or rear optical module to form an afocal variator module.

As taught by applicant's above related applications, an afocal variator focusing means provides a ranging of the front conjugate focus of an optical device, while the rear conjugate that is formed after the rear imaging lens remains spatially constant. This operative factor substantially defines the operative nature of an optical system or device that incorporates an afocal variator focusing means. Consequently, by this definition, the configuration and embodiments of the present invention are in strict compliance, as the present invention does not alter the fact that only the front conjugate ranges while the rear conjugate that is formed after the rear imaging lens system remaining spatially constant from the focal plane. For example, the afocal variator focusing means is distinct from the focusing means taught by Hillman, in which the rear-most imaging system moves to focus and does not maintain itself at a constant rear distance from the focal plane. Consequently, the present invention fully maintains the characteristics of an optical device which otherwise incorporates a total modular afocal variator focusing means, as distinguished from the present use in which a modular negative component is used as an optical focusing means. In either case, the modular central negative lens system. functions the same; it cannot "distinguish" between its use in a total modular afocal variator and when the front, rear or front and rear lens systems of a modular afocal variator focusing means are subsumed and incorporated into the front and rear image-forming, formula-specific optical systems. Essentially, the modular central negative lens system can be defined as having been designed to operate for the "afocal variator condition" whether in a total afocal variator modular focusing means, or when one or more of the original afocal variator's systems are, by art-known computational, empirical and experimental methods, subsumed and incorporated into front and rear imaging optics. The essential factor is that an afocal condition be met as the condition upon which the design of the negative central element modular and effective functions are predicated so that the net effective result of the use of the central negative modular lens system is the same as when used in a total modular afocal variator.

Although the present invention has been described as having a modular central movable negative lens system, and may continue to be described as such, it is possible to build the present invention with a modular central positive lens system, just as it is possible to build total afocal variators with positive central systems and negative outer lens systems. However, such a positive central system construction would be less variable and less efficient than when a negative modular central element is used.

These and other objects of the present invention will become apparent to those skilled in the art from the following detailed description, showing the contemplated novel construction, combination and elements as herein described, and more particularly defined by the appended claims, it being understood that changes in the precise embodiments of the herein disclosed invention are meant to be included as coming within the scope of the claims, except insofar as they may be precluded by the prior art.

DESCRIPTION OF THE DRAWINGS

The accompanying drawings illustrate complete preferred embodiments of the present invention according to the best modes presently devised for the practical application of the principles thereof, and in which.

Figure 1:
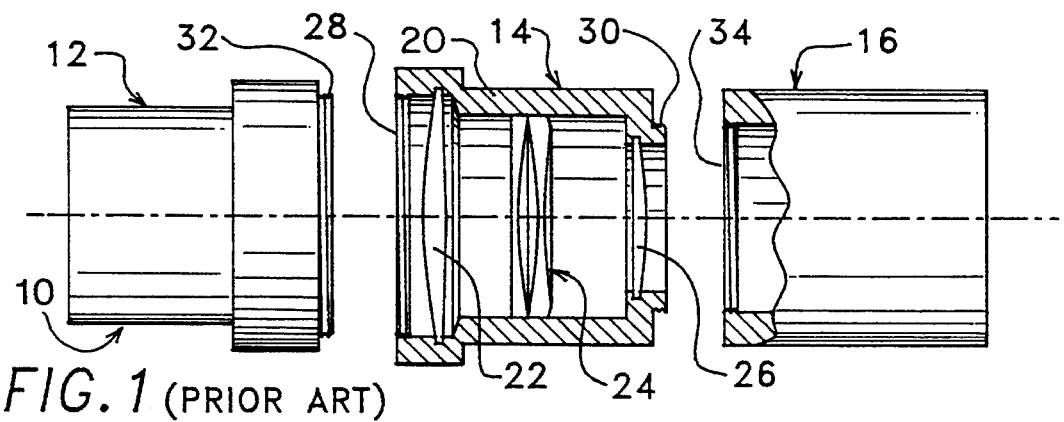
FIG. 1 illustrates an exploded diagrammatic view, partially in section and partially broken away of the prior art modular afocal variator system.

DESCRIPTION OF THE PREFERRED EMBODIMENTS:

Referring to FIG. 1 there is shown in exploded view a priori art optical system, generally 10 consisting of three major modular components which are designed for substantial permanent connection to one another, a front modular optical system 12, an afocal variator modular optical system 14, shown in cross-section, and a rear modular optical system 16 shown partially broken away. As illustrated, the afocal variator optical system 14 consists of a fixed length tube 20 in which there is located a front positive lens 22, a central negative lens element 24, in this case a negative doublet, and a rear positive lens 26. Front positive lens 22 and rear positive lens 26 are secured to tube 20 in a manner such that the distance between them is substantially fixed. However, negative lens 24 is located within tube 20 and constructed in such a manner that it can be moved continuously within tube 20 up and back between front lens 22 and rear lens 26. That is, negative lens 24 is capable of being moved towards and away from front lens 22 and is also capable of being moving towards and away from rear lens 26. All of this is made possible by the system for holding the lenses of the afocal variator optical system 14. This holding system may consist of tube 20, as shown, or of any other lens holding system, such as a lens positioning platform system of the type that is well known in the art, or the like. As shown, tube system 20 includes front connecting means, in this case a series of female threads 28 and rear connecting means, in this case a series of male threads 30, to which front optical system 12 and rear optical system 16 can be appropriately connected by means of their own male and female thread connectors 32 and 34, respectively. Negative lens 24 may be moved within tube 20 by any art known means for providing continuous linear motion to a lens.

Figure 2:
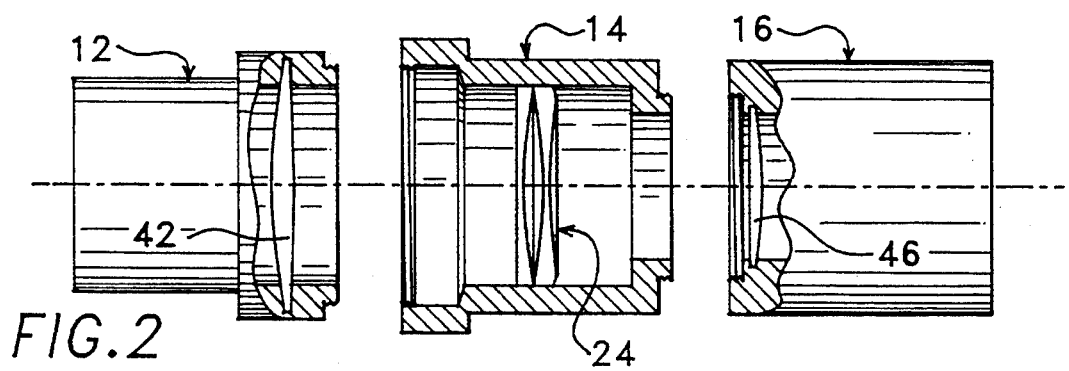
FIG. 2 is an exploded diagrammatic view, partially in section and partially broken away, which illustrates the present invention in which a movable negative lens of an afocal variator optical system module is positioned between a front optical system module and a rear optical system module, each of which provide an optical element to complete the afocal variator optical system.

Now referring to FIG. 2, there is shown the present invention in which both the front positive lens 22 and the rear positive lens 26 of the afocal variator have been removed, and in which lenses 42 and 46 have been placed at the rear of tube 12 and at the front of tube 16, respectively. Lens 42 in tube 12 preferably has the combined optical characteristics of its original optical module and of lens 22 of FIG. 1, while lens 46 preferably has the combined optical characteristics of the original optical module of tube 16 and of lens 26. Note that the central lens module 24 is not altered. In effect, the system of FIG. 2 has reduced the total number of lenses in the system by two, but has maintained the characteristics of the light beam as it goes to and from the central negative lens module.

For example, in the prior art, of FIG. 1, the afocal variator may be surrounded by a +75 mm positive lens 52 and a +75 mm lens 16. Now, by removing lenses 22 and 26, as shown in FIG. 2, the essential characteristics of the original can be maintained. This is accomplished by replacing lens 12 (+75 mm) with a +50 mm lens 42. This can be done with the front lens because replacement lens 42 +50 mm is essentially equal to the combined optical characteristic of the (removed) front lens 22 and the former lens 12. In a similar manner, by replacing lens 16 (+75 mm) with a +50 mm lens 46; essentially, the replacement +50 mm lens is equal to the combined optical characteristic of the (removed) rear lens 26 and the former lens 16. Significantly, both the front and rear focuses change, while the rear conjugate remains constant, therefore, by definition, the system is operating as predicated upon the "afocal variator condition."

Figure 3:
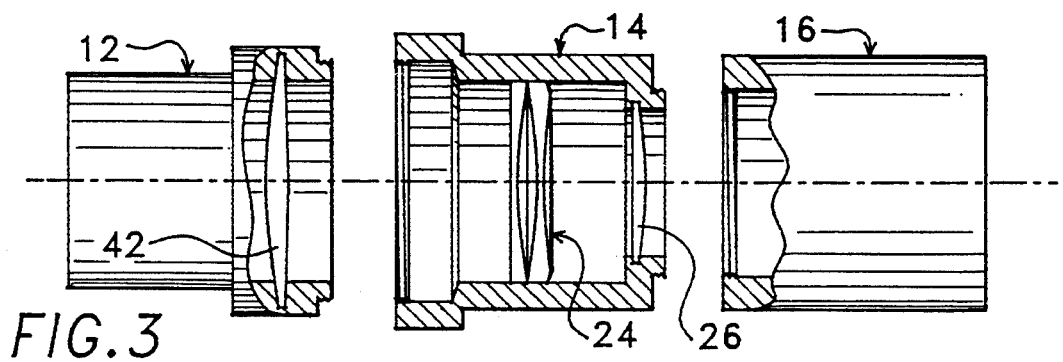
FIG. 3 is an exploded diagrammatic view, partially in section and partially broken away, which illustrates the present invention in which a movable negative lens of an afocal variator optical system module is positioned between a front optical system module and a rear optical system module, and in which only the front optical system module provides an optical element to complete the afocal variator optical system.

Now referring to FIG. 3, there is shown the present invention in which only the front positive lens 22 of the afocal variator has been removed, and a new lens system 42 has been placed at the rear of tube 12. Lens system 42 in tube 12 now has the combined optical characteristics of the lens of tube 12 and of lens 22 of FIG. 1. Note that the central lens module 24 and the rear lens module 16 are not altered from that of FIG. 1. In effect, the configuration of FIG. 3 has reduced the total number of lenses, as compared to FIG. 1 by at least one, but has maintained the characteristics of an afocal variator condition, the light beam as it goes to and from the central negative lens module 24. As in FIG. 2, lenses 12 (+75 mm) and 22 are replaced with a +50 mm lens 42, which replacement lens 42 +50 mm is essentially equal to the combined optical characteristic of the (removed) front lens 22 and the former lens system 12. Significantly, the front focus changes, while the rear conjugate remains constant, which therefore, by definition, causes the system to operate upon the "afocal variator condition."

Figure 4:
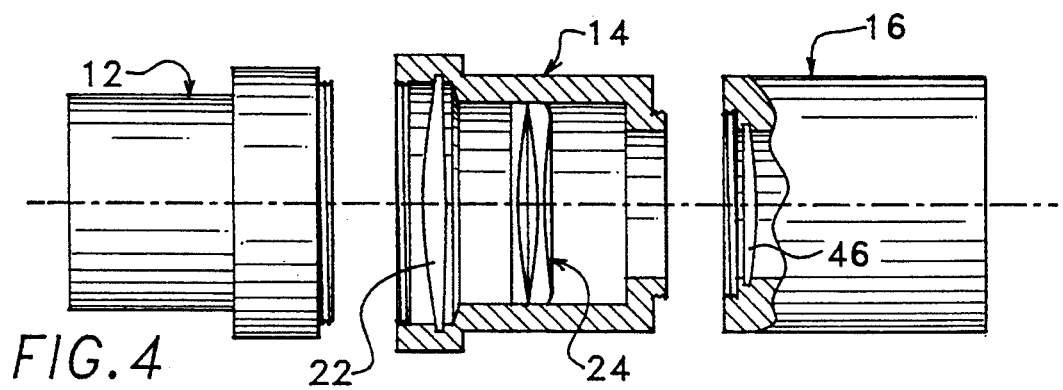
FIG. 4 is an exploded diagrammatic view, partially in section and partially broken away, which illustrates the present invention in which a movable negative lens of an afocal variator optical system module is positioned between a front optical system module and a rear optical system module, and in which only the rear optical system module provides an optical element to complete the afocal variator optical system.

Referring now to FIG. 4, there is shown the present invention in which only the rear positive lens 26 of the afocal variator has been removed, and a new replacement lens 46 has been placed in the front of tube 16. Lens 46 in tube 16 now has the combined optical characteristics of the original lens in tube 16 and of lens 26 of FIG. 1. Note, that in this embodiment the central lens module 24 and the front lens module 12 is not altered from that of FIG. 1. In effect, we have again, as in FIG. 3, reduced the total number of lenses in the system, as compared to FIG. 1, by one, but have maintained the characteristics of the light beam as it goes to and from the central negative lens module 24. For example, by replacing lens 16 (+75 mm) with a +50 mm lens 46; essentially, the replacement +50 mm lens is equal to the combined optical characteristic of the (removed) rear lens 26 and the former lens 16. Significantly, both the front focus changes, while the rear conjugate 46 remains constant, therefore, by definition, the system is operating as predicated upon the "afocal variator condition."

The partial afocal variator optical module 14 of the present invention has independent utility as an optical module which carries at least a negative lens system which is suitable for use in an afocal variator. The central variator optical module 14 also has utility because any displacement of the central lens 24 can be correlated to analogous reciprocal values of range, aberration effect, refractive effect and, possibly, dispersive effect. For example, when module 14 is positioned in a functioning optical system, movement of the central lens 24 of module 14 can be linked to a gauge, potentiometer, piezo-electric device, LED, LCD, or other art-known display system, in order to determine useful values for range-finding. Furthermore, such displacement of the central lens 24 of module 14 can be used to determined refractive properties, for example, when the module 14 of the present invention is incorporated in an eye refractometer.

Additionally, module 14 may be a product in itself, which may interface with other optical products, limited only by physical demands, so that existing optical products may be retrofitted with module 14 of the present invention. For example, module 14 of the present invention may be used to correct telescopical cameras, including satellite borne telescopes with which it is compatible.

Module 14 could also act as a supporting device to connect various optical devices. For example, module 14 could be used to connect the bottom frame of a microscope with the top observation tube, whereby module 14 of the present invention could effect the focus of the entire microscope.

It is thus seen that the present invention provides a modular optical system in which a centrally located partial afocal variator optical system module, which module lacks either a front optical element, or a rear optical element, or both a front and a rear optical element, is combined with a front and a rear optical system module; whereby, by dint of either the front optical system module, or the rear optical system module, respectively, or both the front and the rear optical system modules, either a front optical element or a rear optical element or both a front and the rear optical element are provided to complete the partial afocal variator optical system module. Then, by movement of the negative optical element in the partial afocal variator optical system module, it is now capable of functioning to alter the active focal length of the combined system. It is also seen that the present invention also provides at least the central negative element of an afocal variator system within a modular optical system in which the front optical element, or the rear optical element, or both the front and rear optical elements of the afocal variator optical system are subsumed by the front optical system module, or the rear optical system module, or the combination of the front optical system module and the rear optical system module, whereby the central negative element of the afocal variator system becomes subsumed and incorporated into an image-forming, formula-specific optical system. It is additionally seen that the present invention reduces the number of optical elements in a modular afocal variator optical system in which a centrally located afocal variator optical system is combined with a front optical system module in combination with a rear optical system module, thereby reducing the cost of such a modular system, and permitting the custom design of the front and rear afocal variator lens elements by including them into the image-forming, formula-specific optics surrounding a central modular, non-formula-specific, negative lens system. In addition the present invention provides a negative lens system which is suitable for use in an afocal variator, and which is capable of being moved toward or away from an associated front optical module, rear optical module, or both a front and rear optical module image-forming, formula-specific optical system, which the associated front optical module, rear optical module, or front and rear optical modules providing the optical elements which are required, along with the movable negative lens system to form an afocal variator. This has been taught to be accomplished by first calculating and formulating a modular optical system or optical instrument which includes an afocal variator as the focusing means between a front optical system and a rear optical system; and then, by a process of subsumation, which includes the incorporation of the rear, the front, or the rear and the front optical elements, respectively, of the associated front, or rear, or front and rear optical system, to thereby effectively design and complete the afocal variator optical system. It is thus seen that the system of the present invention has taught an independent non-image forming movable negative central lens system module, which together with the front and/or rear modular imaging systems, provides essentially the same system function as such a modular system in which a complete, independent afocal variator modular optical system is present. Since the front and rear image-forming optical system modules surrounding the afocal variator movable negative lens module incorporate and subsume the characteristics of a complete afocal front and/or rear lens systems of the afocal variator, the central movable negative modular system is virtually the same as an afocal variator in which the front and/or rear lenses were not subsumed and incorporated from a front and/or rear optical module to form an afocal variator module. While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The invention in which an exclusive right is claimed is defined by the following claims:

1. An optical system for use with a front optical system, or with a rear optical system, or with both a front optical system and a rear optical system, for focusing such optical systems, comprised of:
   a partial afocal variator system including a body having a fixed length, said body having a front end and a rear end; and
   an optical element carried by said fixture, said optical element adapted for movement towards and away from said front end and said rear end of said fixed length body; whereby said partial afocal variator system and said moveable optical element when combined with a front optical system, or with a rear optical system, or with both a front optical system and a rear optical system provide the focusing characteristics of a modular afocal variator focusing system.

2. The optical system of claim 1 in which said hollow body has a front connecting element and a rear connecting element to which a front optical system and a rear optical system may be connected.

3. The optical system of claim 2 in which said body is hollow, and said moveable optical element moves within said hollow body.

4. The optical system of claim 3 in which either a front optical system, a rear optical system, or both a front optical system and a rear optical system provide one or more optical elements in conjunction with said partial afocal variator system in order to complete and to form an afocal variator optical module with said partial afocal variator system.

5. A partial afocal variator optical module simulator which can be used in conjunction with a front optical system, or with a rear optical system, or with both a front optical system and a rear optical system to simulate the focusing characteristics of an afocal variator optical system, comprised of:
   an optical module having a fixed length body, said body having a front end and a rear end, and which includes negative lens which is adapted for movement towards and away from said front end and said rear end of said fixed length body, said front end of said optical module including means for receiving and securing a front optical module, and said rear end of said optical module including means for receiving and securing a rear optical module; whereby said partial afocal variator system and said moveable optical element, when combined with a front optical system, or with a rear optical system, or with both a front optical system and a rear optical system provide the focusing characteristics of a modular afocal variator focusing system.

6. The optical system of claim 5 in which said optical module is a fixed length hollow tube body, said moveable negative optical element being within said tube.

7. The partial afocal variator optical module simulator of claim 6 in which a front optical module is secured to said means for receiving and securing a front optical module, said front optical module including as its rear most element a positive lens system which will be located juxtaposed to, but normally spaced from, said movable negative lens within said partial afocal variator optical module simulator, and in which a rear optical module is secured to said means for receiving and securing a rear optical module, said rear optical module including as its front most element a positive lens system which will be located juxtaposed to, but normally spaced from, said movable negative lens within said partial afocal variator optical module simulator; which said front optical system provides an optical element connected to said front of said afocal variator optical module simulator, and said rear optical system provides an optical element adjacent to the rear of said afocal variator optical module simulator, which in combination vary the actual focal length of the front optical system in conjunction with the rear optical system without the need to physically change the length dimension of any system, and without the need to change the position of any lens other than the central movable negative optical element, and without the need to change the lenses of the front or rear optical systems; whereby the combined optical system has the focusing characteristics of a modular afocal variator focusing system.

8. The optical system of claim 7 in which the movable negative central optical element is so positioned and controlled that it is capable of operating like an afocal variator optical module by being moved continuously towards and away from the front optical system module, and towards and away from the rear optical system module of a total optical system device or instrument.

9. The partial afocal variator optical module simulator of claim 6 in which a front optical module is secured to said means for receiving and securing a front optical module, said front optical module including as its rear most element a positive lens system which will be located juxtaposed to, but normally spaced from, said movable negative lens within said partial afocal variator optical module simulator, and in which a positive lens system is located within said rear of said partial afocal variator optical module simulator juxtaposed to, but normally spaced from, said movable negative lens.

10. The partial afocal variator optical module simulator of claim 6 in which a rear optical module is secured to said means for receiving and securing a rear optical module, said rear optical module including as its front most element a positive lens system which will be located juxtaposed to, but normally spaced from, said movable negative lens within said partial afocal variator optical module simulator, and in which a positive lens system is located within said front of said partial afocal variator optical module simulator juxtaposed to, but normally spaced from, said movable negative lens.

11. A partial afocal variator optical module simulator which can be used in conjunction with a front optical system, or with a rear optical system, or with both a front optical system and a rear optical system to simulate an afocal variator optical system, comprised of:

an optical module having a fixed length hollow tube body, said body having a front end and a rear end, said front end of said optical module including means for receiving and securing a front optical module, and said rear end of said optical module including means for receiving and securing a rear optical module; a movable negative lens within said tube;

a front optical module secured to said means for receiving and securing a front optical module, said front optical module including as its rear most element a positive lens system which will be located juxtaposed to, but normally spaced from, said movable negative lens within said tube; and a rear optical module secured to said means for receiving and securing a rear optical module, said rear optical module including as its front most element a positive lens system which will be located juxtaposed to, but normally spaced from, said movable negative lens within said partial afocal variator optical module simulator; wherein, said front optical module provides an optical element connected to said front of said afocal variator optical module simulator, and said rear optical module provides an optical element adjacent to the rear of said afocal variator optical module simulator, which in combination vary the actual focal length of the front optical system in conjunction with the rear optical system without the need to physically change the length dimension of any system, and without the need to change the position of any lens other than the central movable negative optical element, and without the need to change the lenses of the front or rear optical systems; whereby the combined optical system has the focusing characteristics of a modular afocal variator focusing system.

* * * * *